United States Patent [19]

Yamamoto

[11] Patent Number: 5,010,970
[45] Date of Patent: Apr. 30, 1991

[54] POWER-ASSISTED STEERING SYSTEM

[75] Inventor: Toshihiko Yamamoto, Hiroshima, Japan

[73] Assignee: Mazda Motor Corporation, Hiroshima, Japan

[21] Appl. No.: 357,194

[22] Filed: May 26, 1989

[30] Foreign Application Priority Data

May 27, 1988 [JP] Japan ................. 63-130783
Oct. 31, 1988 [JP] Japan ................. 63-275045

[51] Int. Cl.$^5$ ............................................. B62D 5/04
[52] U.S. Cl. ............................. 180/79.1; 74/484 R; 192/0.02 R; 192/54
[58] Field of Search ............... 180/79.1; 74/567, 569, 74/388 PS, 625, 484 R; 192/0.02 R, 38, 54, 44

[56] References Cited

U.S. PATENT DOCUMENTS

| | | | |
|---|---|---|---|
| 1,775,163 | 9/1930 | Fuller | 180/79.1 |
| 1,863,567 | 6/1932 | Fisher | 180/79.1 |
| 2,553,795 | 5/1951 | Staude | 180/79.1 |
| 2,603,496 | 7/1952 | Richert | 192/54 |
| 3,150,750 | 9/1964 | Georges | 192/38 |
| 3,414,097 | 12/1968 | Denkowski | 192/38 |
| 3,499,511 | 3/1970 | Bouhot | 192/38 |
| 4,301,739 | 11/1981 | Mehren | 180/79.1 |
| 4,319,672 | 5/1982 | Barthelemy | 192/54 |
| 4,343,386 | 8/1982 | Schaefer et al. | 192/54 |
| 4,577,716 | 3/1986 | Norton | 180/79.1 |
| 4,676,331 | 6/1987 | Iwaki et al. | 180/79.1 |
| 4,852,707 | 8/1989 | Ito et al. | 192/44 |

Primary Examiner—Charles A. Marmor
Assistant Examiner—A. M. Boehler
Attorney, Agent, or Firm—Fleit, Jacobson, Cohn, Price, Holman & Stern

[57] ABSTRACT

A power-assisted steering system for an automotive vehicle has a steering shaft rotatably supported by a steering column, a steering wheel and an electric motor for assisting in rotating the steering shaft when the steering torque is too great. The electric motor has an output shaft offset from the steering shaft. A power-assisting structure includes a motor driven member and is mounted on the steering shaft for selectively connecting a steering torque transmitted from the steering wheel or the motor output transmitted from motor driven member to the steering shaft. A torque detector is disposed between the steering wheel and the steering shaft to detect a predetermined torque imparted to the steering wheel so as to actuate the electric motor, whereby assisting in rotating the steering shaft.

18 Claims, 12 Drawing Sheets

POWER-ASSISTED STEERING SYSTEM

FIELD OF THE INVENTION

The present invention relates to a novel construction for a power-assisted steering system having an electric motor offset from a steering shaft, and more particularly, to a power-assisted steering system having a novel power-assisting structure.

BACKGROUND OF THE INVENTION

An automobile steering system has been developed with power-assisting effect obtained by means of an actuator, such as an electric motor. When the electric motor is used in assisting or aiding the driver's steering wheel turning effort for manipulating the front wheels, it is desirable, for energy saving, to actuate the electric motor only when a reaction imparted to the steering wheel from the front wheels of a car in motion is too great. A motor-assisted steering system has a torque sensor for detecting the steering torque transmitted from a steering wheel so as to actuate the electric motor, and impart assisting torque to the steering shaft.

One such power-assisted steering system is known from, for example, Japanese Unexamined Patent Publication No. 61-287,861 entitled "Power-Assisted Steering System For Automotive Vehicle" published Dec. 18, 1986. The power-assisted steering system, which is an in-line, self-contained power-assisted steering system, utilizes a frameless electric motor incorporated in a steering shaft structure or assembly. Because of an integral structure of the electric motor integrally contained in the steering shaft structure or assembly, the steering shaft structure must be disassembled every time a power-assisting unit is maintained or replaced.

Another power-assisting unit described in, for example, Japanese Unexamined Utility Model Publication No. 59-79467 entitled "Motor-Assisted Steering System" laid open May 29, 1984, comprises a drive steering shaft element secured to a steering wheel and a driven steering shaft element secured to a steering gear unit which are coupled together by means of a torsion spring member so as to allow a relative rotational motion therebetween, and clutch means disposed between a drive gear member driven by means of an electric motor and either one of the drive and driven steering shaft elements so that the motor output transmitted from the drive gear member is connected to or cut off from the one steering shaft element. The clutch means consists of cam surfaces formed in either one of the drive gear member and the one steering shaft element, and cam follower members interposed between the cam surfaces and the other of the drive gear member and the one steering shaft element and cooperated with the other steering shaft element.

In the motor-assisted steering system, when no relative rotational motion occurs between the drive and driven steering shaft elements, the cam follower member is held between the drive gear member and the one steering shaft element with a slight clearance, whereby the motor output transmitted from the drive gear member is cut off from the one steering shaft element. On the other hand, when a steering torque to be imparted to the steering wheel in order to manipulate the front wheels on turn is too great so that it will cause a relative rotational motion between the drive and driven steering shaft elements, the cam follower member is tightly grasped between the cam surface and the one steering shaft element, whereby the motor output transmitted from the drive gear member is connected to the one steering shaft element, so as to assist the driver in turning or manipulating the front wheels of a car in motion.

A problem in association with such motor-assisted steering systems is that, because each cam follower member acts on a cam surface upon right and left turns of the front wheels of a car in motion and the size and location of the cam follower member is determined depending on the dimensions of the cam surface and the one steering shaft element, the strut angle or the angle of contact of the cam follower member (which is defined by the angle between the cam surface and a tangent to a contact point of the cam follower member to the one steering shaft element) is substantially same for both right and left turns. If the strut angle is not suitably designed for right and left turns, the cam follower member will tend to slip when locking the clutch means or not to become loose when releasing the clutch means.

SUMMARY OF THE INVENTION

It is, therefore, an object of the present invention to provide a power-assisted steering system which is constructed for ease of maintenance and replacement.

It is another object of the present invention to provide a power-assisted steering system which enables establishment of a desirable strut angle of a cam surface for right and left turns and a desirable angular displacement of a cam follower member necessary to lock a clutch means.

The objects of the present invention are achieved by a power-assisted steering system for an automotive vehicle having a steering shaft rotatably supported by a steering column. A steering wheel transmits a steering torque to the steering shaft and an electric motor assists in rotating the steering shaft when the steering torque transmitted from the steering wheel becomes higher than a predetermined torque. The electric motor has an output shaft offset from the steering shaft. A power-assisting structure includes a motor driven member and is disposed on the steering shaft for selectively connecting a steering torque transmitted from the steering wheel or the motor output transmitted to the motor driven member from the offset shaft of the motor to the steering shaft. A torque detector is disposed between the steering wheel and the steering shaft to detect a predetermined torque imparted to the steering wheel so as to actuate the electric motor, thereby assisting in rotating the steering shaft.

Because the power-assisting structure includes the motor driven member mechanically connected to the motor output shaft offset from the steering shaft and the torque detector as one integral whole, it is sufficient for maintenance and replacement of the power-assisting structure to remove the steering wheel.

The power-assisting structure includes clutch means which consists of a plurality of cam surfaces formed on a driven member secured to the steering shaft and two cam follower members for each cam surface interposed between the cam surface and the motor driven member. The two cam followers are respectively grasped between the cam surface and the motor driven member upon right and left turns of the steering wheel.

Because of the two cam follower members for each cam surface, a strut angle of the cam surface and an angular displacement of the cam follower member can be desirably designed.

BRIEF DESCRIPTION OF THE DRAWINGS

Other objects and advantages of the invention will be apparent upon reading the following detailed description of illustrative embodiments of the invention in conjunction with the accompanying drawings in which like reference numerals denote like parts throughout the views, and wherein.

DETAILED DESCRIPTION OF THE INVENTION

Figure 1:
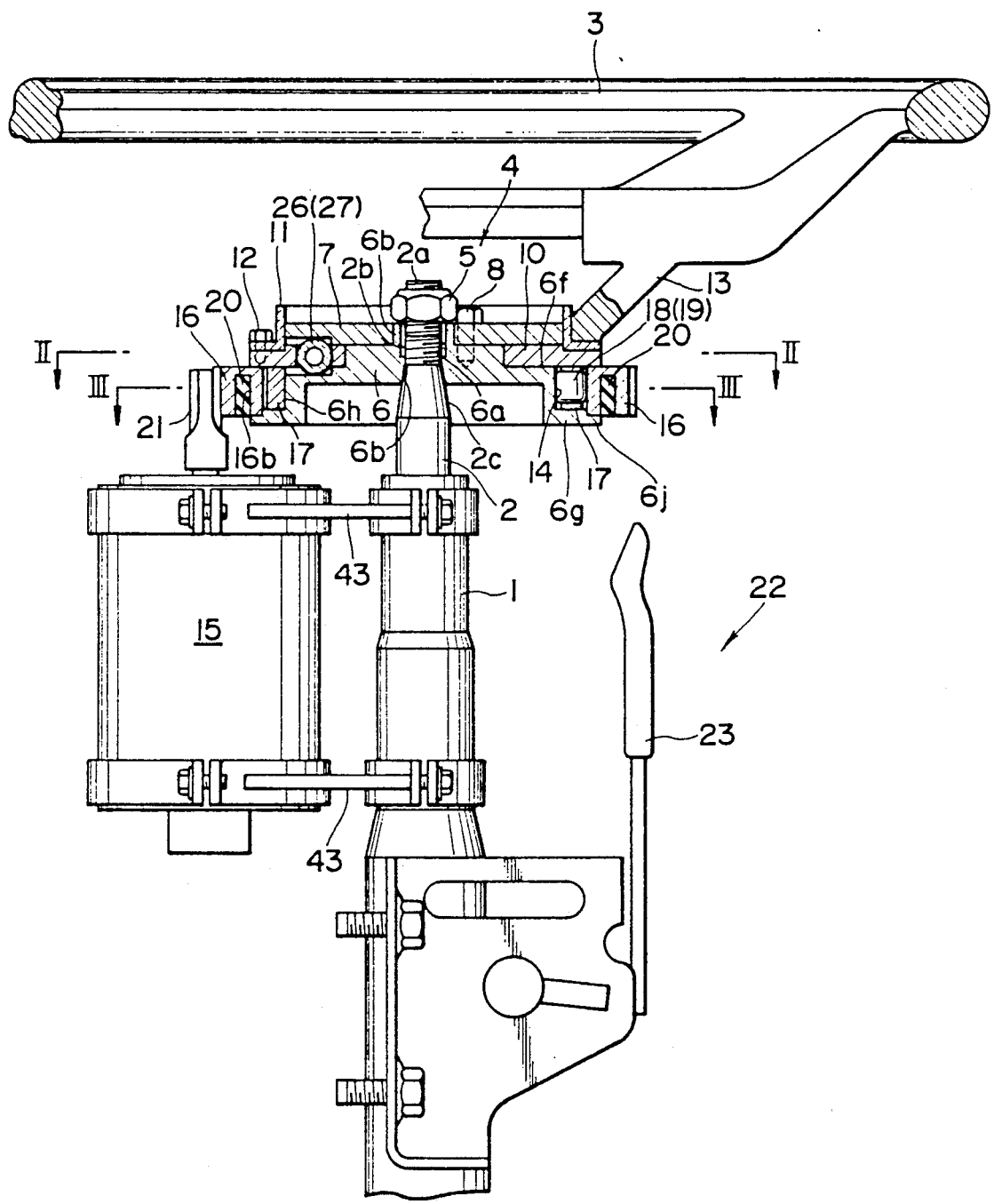
FIG. 1 is a side view, partly in section, showing an essential part of a power-assisted steering system in accordance with a preferred embodiment of the present invention.
Figure 2:
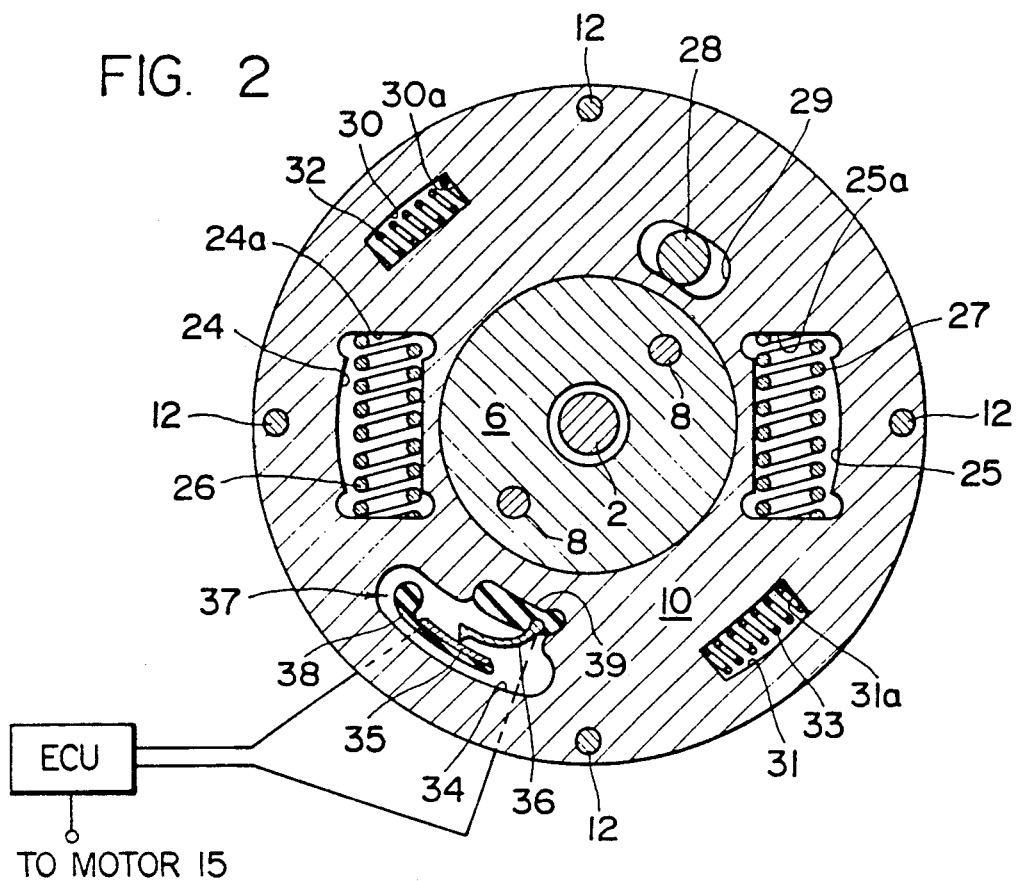
FIG. 2 is a cross-sectional view of FIG. 1 taken along line II—II.
Figure 3:
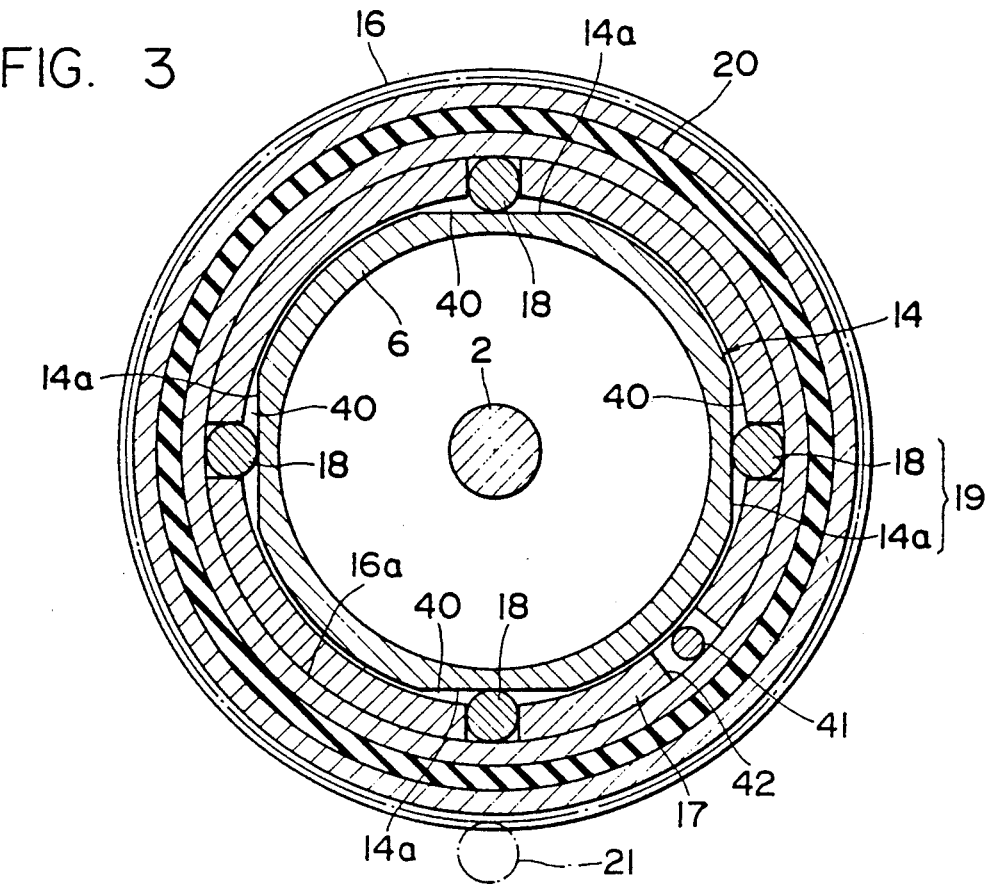
FIG. 3 is a cross-sectional view of FIG. 1 taken along line III—III.

Referring to the drawings, in particular to FIGS. 1 to 3, a power-assisted steering system in accordance with a preferred embodiment of the present invention is shown, comprising a hollow cylindrical steering column 1 and a steering shaft 2 supported for rotation by the steering column 1. A steering wheel 3, shown partly in FIG. 1, is mounted on the top end of the steering shaft 2 by means of a power-assisting unit 4. The top end of the steering shaft 2 is formed with a small diameter threaded portion 2a, a large diameter threaded portion 2b and a tapered end 2c. The power-assisting unit 4 consists of a drive member 10 in the form of a disk plate (which is hereinafter referred to as a drive steering disk) and a driven member 6 in the form of a drum (which is hereinafter referred to as a driven steering drum). The driven steering drum 6 has a center bore 6a formed with female threads and a tapered bore 6b. The driven steering drum 6 is screwed on the large diameter threaded portion 2b of the steering shaft 2 until the tapered bore 6b of the driven steering drum 6 tightly fits the tapered end 2c of the steering shaft 2. A lock nut 5 is screwed on the small diameter threaded portion 2a of the steering shaft 2 to prevent the driven steering drum 6 from loosening. An upper disk 7 is mounted on a hub 6d of the driven steering drum 6 and secured to the driven steering drum 6 with two set screws 8. The drive steering disk 10 is mounted on the driven steering drum 6 for rotation relative to the steering shaft 2 and interposed and slidably grasped between the upper disk 7 and an intermediate step portion 6f of the driven steering drum 6. A flanged annular seating ring 11 surrounding the outer periphery of the upper disk 7 is secured to the drive steering disk 10 with set screws 12 at several points. Ribs 13 of the steering wheel 3 (only one of which is shown) are soldered or welded to the flanged annular seating ring 11.

A cylindrical wall 6h of the driven steering drum 6 between the intermediate step portion 6f and a lower step portion 6g is formed with a peripheral cam surface 14. An annular retainer ring 17 is rotatably fitted around the peripheral cam surface 14 of the cylindrical wall 6h of the driven steering drum 6 and interposed between the drive steering disk 10 and a lower step portion 6g of the driven steering drum 6 and holds four cylindrical cam follower rollers 18 which cooperate with cam sections of the peripheral cam surface 14 as a clutch mechanism 19 for the power-assisting unit 4, as will be described in detail later. The annular retainer ring 17 holds four cylindrical rollers 18 at angular spacings of 90° and is interposed between the cam surface 14 and a motor driven member in the form of a ring gear 16 formed with external threads. The ring gear 16 is supported for rotation between the drive steering disk 10 and a shouldered circumferential edge portion 6j of the driven steering drum 6 and in mesh with a threaded output shaft 21 of an electric motor 15. The ring gear 16 has an internal annular groove 16b formed therein and a vibration isolator ring member 20, such as made of rubber or plastic materials, embedded in the annular groove 16b of the ring gear 16 by groove 16b and member 20, the ring gear 16 is made, slightly bendable, so that the output shaft 21 of the electric motor 15 can be kept in flexible meshed engagement with the gear ring 16. The electric motor 15 is secured or bolted to the steering column 1 by way of brackets 43. A tilt steering unit 22 with an operating lever 23 is provided in association with the steering shaft 2. The tilt steering unit 22 can be any tilting mechanism well known to those skilled in the art and, therefore, the tilt steering unit need not be shown in detail here.

The drive steering disk 10 is mounted for rotation relative to the steering shaft 2 on the driven steering drum 6 and interposed between the upper disk 7 and the intermediate step portion 6f of the driven steering drum 6 and is, as shown in FIG. 2, formed therein with a pair of generally rectangular openings 24 and 25 positioned symmetrical with respect to the axis of rotation of the steering shaft 2. These openings 24 and 25, respectively, receive therein torsion springs 26 and 27 stretched between retaining pins (not shown) secured to the upper surface of the intermediate step portion 6f of the driven steering drum 6 and one ends 24a and 24a of the openings 24 and 25 which are located unsymmetrically with respect to the axis of rotation of the steering shaft 2. The torsion springs 26 and 27 operationally couple the drive steering disk 10 to the driven steering drum 6 so as to connect a steering or turning torque transmitted from the steering wheel 3 to the driven steering drum 6 from the drive steering disk 10. That is, when the steering wheel 3 is turned to the left, the drive steering disk 10 expands the torsion spring 27 in the opening 25 but compresses the torsion spring 26 in the opening 24, causing a left turn of the driven steering drum 6. Similarly, when the steering wheel 3 is turned to the right, the drive steering disk 10 compresses the torsion spring 27 in the opening 25 but expands the torsion spring 26 in the opening 24, causing a right turn of the driven steering drum 6. The torsion springs 26 and 27 are so designed as not to be compressed or expanded when a normal steering torque lower than a predetermined steering torque imparted thereto, and in this condition cause no slippage between the steering shaft 2 and the steering wheel 3. To define the extremities of left and right turns of the drive steering disk 10, the drive steering disk 10 is formed with a circular arcuate slot 29 in which a limit pin 28 secured to the intermediate step portion 6f of the driven steering drum 6 is movably received.

The drive steering disk 10 is further formed therein with a pair of generally rectangular openings 30 and 31, narrower than the openings 24 and 25, positioned symmetrically with respect to the axis of rotation of the steering shaft 2. These openings 30 and 31, respectively, receive therein torsion springs 32 and 33 stretched between latch members (not shown) secured to the annular retainer ring 17 mounted on the driven steering drum 6 and one ends 30a and 31a of the openings 30 and 31 which are unsymmetric with respect to the axis of rotation of the steering shaft 2. The torsion springs 32 and 33 have the same external diameter, smaller than that of the torsion springs 26 and 27. As will be described in detail later, the torsion springs 32 and 33 cooperate with the clutch mechanism 19 which will be described in detail later.

The drive steering disk 10 is further formed with an opening 34 which is of a generally circular arcuate shape and sufficiently large to receive therein a torque detector 37 for detecting a steering torque imparted to the steering wheel 3. The torque detector 37, which is a potentiometer or a sliding contact resistor device, consists of a resistance wire 35 held by a rubber-insulator 38 secured to and standing from the upper surface of the middle step 6f of the driven steering drum 6, and a sliding contact 36 supported by a rubber-insulator 39 secured to an inner wall of the opening 34. The resistance wire 35 is applied with a certain predetermined voltage. When a steering torque imparted to the steering wheel 3 is so great that it will cause a slippage of the driven steering drum 6 relative to the drive steering disk 10 against the torsion springs 26 and 27, the torque detector 37 generates an electric signal proportional to the angular position of the drive steering disk 10 relative to the driven steering drum 6. An electric control unit (ECU) which is conventional and known and would be readily apparent to a person skilled in the art, receives this signal and causes the electric motor 15 to rotate so as to assist the driver in manipulating front or rear drive wheels. It is desirable to incorporate a control circuit in the electric control unit for manually adjusting the output torque of the electric motor 15. Such a control circuit performs adjusting the gain of a servo-amplifier and controlling a current output from a signal shaping circuit.

The clutch mechanism 19 comprises four cam follower rollers 18 held by the annular retainer ring 17 and four cam sections 14a formed in the cam surface 14 of the cylindrical wall 6h of the driven steering drum 6 at regular angular spacings of 90°. Each cam section 14a has a surface perpendicular to a straight line intersecting the center of the steering shaft 2 to form a wedge-like space 40 in cooperation with the inner surface of the retainer ring 17. The can follower rollers 18 are interposed between the surfaces of the cam sections 14a and the inner surface 16a of the ring gear 16, respectively. Each cam follower roller 18 is slightly loosened when situated midway between the extremities of the wedge-like space 40. As long as no relative rotational motion is caused between the drive steering disk 10 and driven steering drum 6 coupled together by means of the torsion springs 26 and 27, the cam follower rollers 18 are kept midway in the wedge-like spaces 40, respectively. Under such a condition, the normal steering torque transmitted from the steering wheel 3 is directly connected to the steering shaft 2 without any assistance from the electric motor 15.

With an increase of steering torque, the torsion springs 26 and 27 are reciprocally deformed, allowing the drive steering disk 10 to make a relative rotational motion with respect to the driven steering drum 6. This causes a relative rotational motion between the retainer ring 17 coupled to the drive steering disk 10 by means of the torsion springs 32 or 33 and the driven steering drum 6, and a circumferential displacement of the cam follower rollers 18 with respect to the cam sections 14a, forcing the cam follower rollers 18 tightly against the inner surface 16a of the ring gear 16. When the relative motion of the drive steering disk 10 reaches a certain amount, the cam follower rollers 18 will have moved to the positions where the pressure or friction on the inner surface 16a of the ring gear 16 is so great that it will not allow any slippage of the ring gear 16 with respect to the cam follower rollers 18, locking the power-assisting unit 4, and in particular locking the drive steering disk 10 and the ring gear 19 together. In this locking mode, the power-assisting unit 4 operates as one whole solid unit with no slippage or relative rotational motion between the steering wheel 3 and the steering shaft 2.

Upon a relative rotational motion of the drive steering disk 10, the torque detector 37 outputs an electric signal to the electric control unit (ECU) indicating the changing angular position of the drive steering disk 10 relative to the driven steering drum 6. The electric control unit (ECU), when receiving the position signal, causes the electric motor 15 to rotate in a direction in which the drive steering disk 10 is forced, driving the ring gear 16, so as to assist the driver in manipulating the front wheel. As the steering torque imparted to the drive steering disk 10 is gradually removed or decreased, the expanded and urged torsion springs 27 and 33 will tend to contract and the contracted torsion springs 26 and 32 will tend to expand, moving back the drive steering disk 10, so that the rollers 18 return toward their neutral positions. With the backward movement of the drive steering disk 10, the torque detector 37 outputs an electric signal to the electric control unit (ECU) indicating the changing angular position of the drive steering disk 10 relative to the driven steering drum 6. The electric control unit (ECU) causes the electric motor 15 to gradually slow down and stop when the rollers 18 reach their neutral positions. If the steering torque is fully removed, the torsion springs 26 and 27 are balanced so as to keep the rollers 18 at their neutral positions. To prevent the rollers 18 from firmly biting into the wedge-shaped spaces defined between the surfaces of the cam sections 14a and the inner surface 16a of the ring gear 16, a stopper pin 41 extending from the under surface of the drive steering disk 10 enters a rectangular recess 42 formed in the retainer ring 17 so as to limit an excessive rotational movement of the drive steering disk 10 to the left or right. It is preferred to make the circumferential length of the rectangular recess 42 shorter than the movable distances of the rollers 18.

If the electric motor 15 should rotate in a direction opposite to the direction in which it must rotate to assist the driver's steering effort due to troubles in the motor control system, the ring gear 16 is forced in the opposite direction, whereby the locking of the power-assisting unit 4, in particular the drive steering disk 10 and the ring gear 16, is released, so as to contribute to or ensure the safety of steering the wheels of the car on turns.

Because of the rectangular recess 41 having a circumferential length shorter than a movable distance of the roller 18, that is, the maximum relative rotation of the retainer ring 17 with respect to the drive steering disk 10 is smaller than the movable distances of the rollers 18, the steering unit is prevented from being accidentally locked up even when the electric motor 15 rotates too fast. More particularly, if the electric motor 15 rotates too fast, the retainer ring 17 that tends to turn following the rotation of the ring gear 16 is braked or forced back with the stopper pin 41 by virtue of the steering torque imparted or transmitted to the drive steering disk 10 through the steering wheel 3, so as to release the rollers 18 from being squeezed or bitten.

Figure 4:
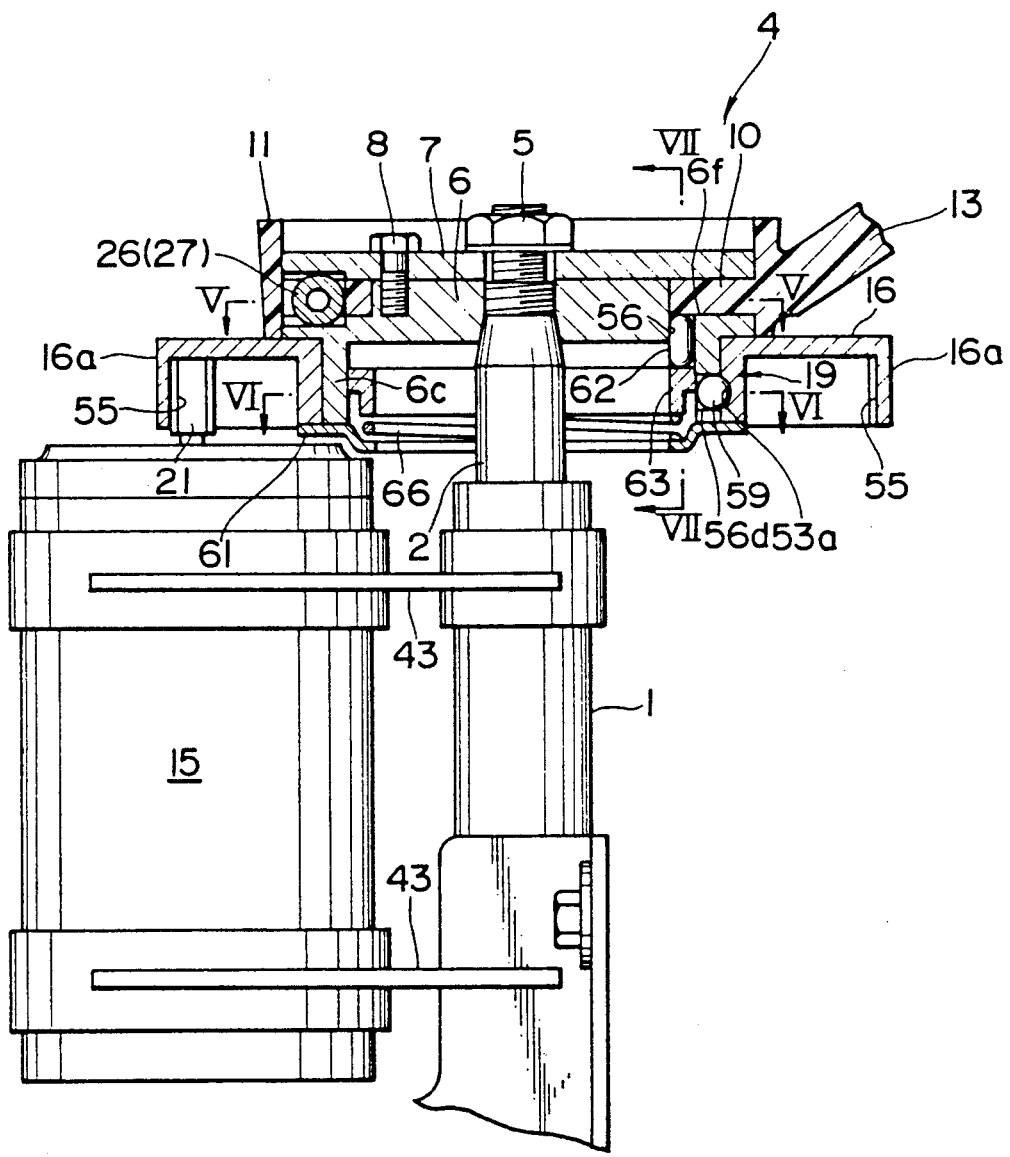
FIG. 4 is a side view, partly in section, showing an essential part of a power-assisted steering system in accordance with another preferred embodiment of the present invention.
Figure 5:
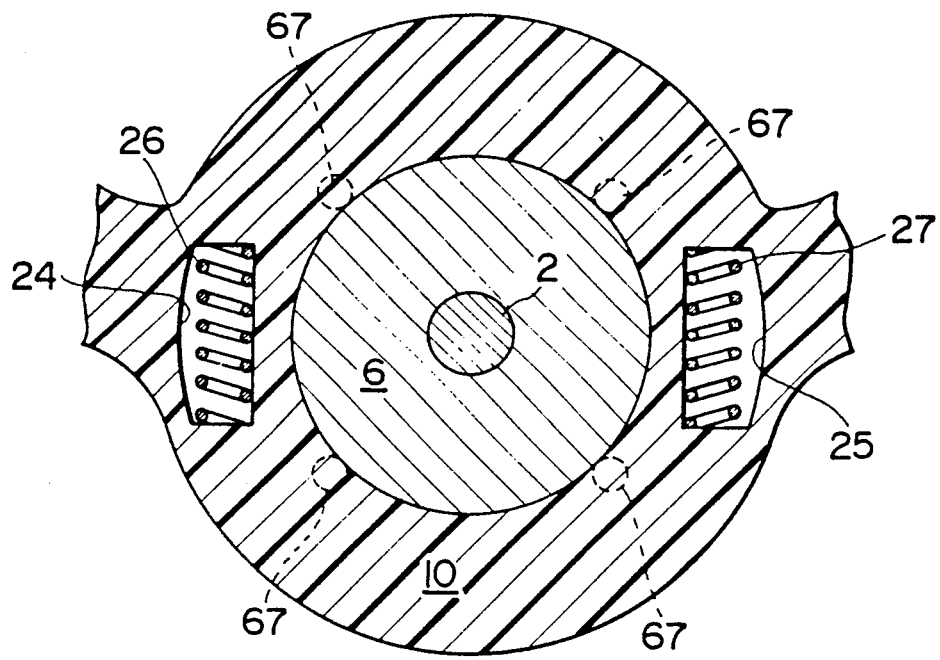
FIG. 5 is a cross-sectional view of FIG. 4 taken along line V—V.
Figure 6:
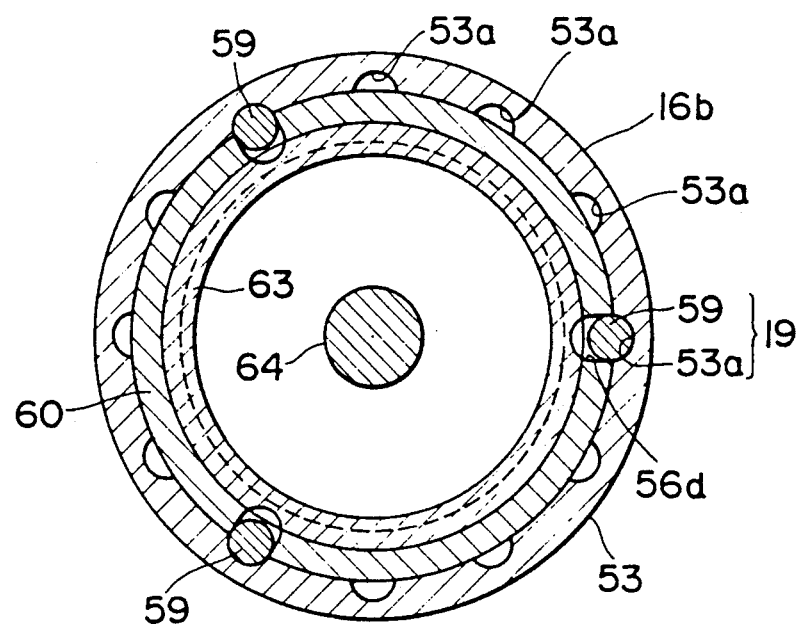
FIG. 6 is a cross-sectional view of FIG. 4 taken along line VI—VI.

Referring to FIGS. 4 to 6, a power-assisted steering system in accordance with another preferred embodiment of the present invention is shown, having a power-assisting unit including a clutch mechanism which is different in structure from that of the previous embodiment. Although not shown in FIGS. 4 to 6 for clarity purpose, the power-assisted steering system of this embodiment is provided with a torque detector of which operation and fabrication is similar to that of the previous embodiment and does not need to be explained. The power assisted steering system in accordance with this preferred embodiment of the present invention comprises a generally cylindrical steering column 1 and a steering shaft 2 supported for rotation by the steering column 1. A steering wheel 3, shown partly in FIG. 4, is attached to the top end of the steering shaft 2 by means of a power-assisting unit 4. The power-assisting unit 4 consists of a driven steering drum 6 screwed on the top of the steering shaft 2. A lock nut 5 is screwed on the top of the steering shaft 2 to tighten the driven steering drum 6 and prevent it from loosening. A support disk plate 7 is mounted on a hub of the driven steering drum 6 and secured to the driven steering drum 6 with set screws 8 at several points.

A drive steering disk 10, which is secured to or integral with ribs 13 of the steering wheel 3 (only one of which is shown) and is integrally formed with an annular seating ring 11, is mounted for rotation relative to the driven steering drum 6, and hence the steering shaft 2, on the driven steering drum 6 and interposed between the support disk plate 7 and a stepped portion 6f of the driven steering drum 6. The stepped portion 6f of the driven steering drum 6 is formed with an axially extending bore 56 which slidably receives therein a round-end steel pin 62 which constitutes a part of the clutch mechanism 19. A lower cylindrical wall 6c of the driven steering drum 6 is formed with a plurality of, for example three in this embodiment, bores 56d radially penetrating therethrough at regular angular spacings. Each radial bore 56d slidably receives therein a steel ball 59 which constitutes a part of the clutch mechanism 19.

The drive steering disk 10 is formed therein with a pair of generally rectangular openings 24 and 25 symmetrically located with respect to the axis of rotation of the steering shaft 2. These openings 24 and 25, respectively, receive therein torsion springs 26 and 27 stretched between the stepped portion 6f of the driven steering drum 6 and one ends of the openings 69 and 70. The torsion springs 26 and 27 operationally couple the drive steering disk 10 and the driven steering drum 6 in the same manner as described in the previous embodiment.

A ring gear 16 as a motor driven member, which has a U-shaped cross section and of which the outer wall 16a is formed with internal threads, is mounted for rotation on the lower cylindrical wall 6c of the driven steering drum 6, and interposed and grasped between a stepped portion 6f of the driven steering drum 6 and a retainer ring 61 secured to the bottom of the lower cylindrical wall 6c of the driven steering drum 6 by means of a well known manner, such as soldering, so as to be prevented from axially moving. A threaded output shaft 21 of an electric motor 15 is in mesh with the internal threads 55 of the ring gear 16. The electric motor 15 is fixedly attached to the steering column 1 by way of brackets 43. The ring gear 16 is formed with a plurality of, for example twelve in this embodiment, semi-spherical side recesses 53a in the outer surface of the inner wall 16b thereof at regular angular spacings. A ring 63 as a clutch actuation means, which has a generally L-shaped cross section, is slidably fitted in the lower cylindrical wall 6c of the driven steering drum 6 and urged axially upwardly by means of a torsion spring 66 disposed between the retainer ring 61 and the lower end thereof so as to force the clutch pin 62 upward.

Figure 7:
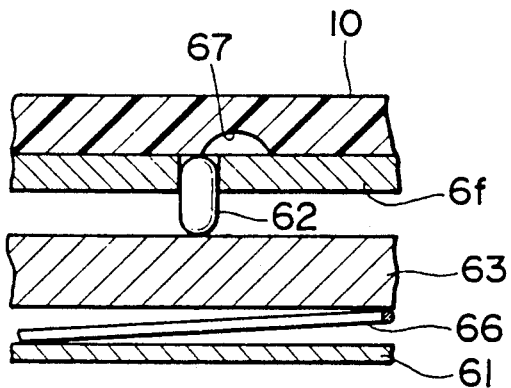
FIGS. 7 to 9 are enlarged cross-sectional views showing a clutch mechanism.

The drive steering disk 10 is formed with four semi-spherical recesses 67 in the under surface at regular angular spacings in the under surface 60b thereof as shown in FIG. 7. When the drive steering disk 10 is at an ordinary position where the recesses 67 of the drive steering disk 6 meet the clutch pins 62, the torsion spring 66 forces the clutch actuation ring 63 upward, thus pushing the clutch pins 62 to enter the recesses 67 of the drive steering disk 10, so that the driven steering drum 6 and the drive steering disk 10 are coupled together. Simultaneously, when the clutch actuation ring 63 is forced upward, the clutch balls 59 are pushed out of the side recesses 53a of the ring gear 16, as shown in FIG. 8, to operationally disconnect the driven steering drum 6 from the ring gear 16, allowing the drive steering disk 10 to rotate relative to the ring gear 16.

Figure 8:
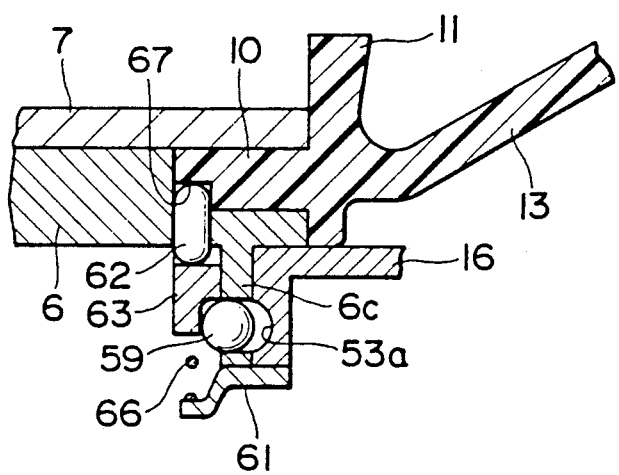

When the steering torque applied to the steering wheel 3, and hence the drive steering disk 10 at its neutral position, is so moderate that no relative rotation is caused between the driven steering drum 6 and the drive steering disk 10, the recesses 67 of the drive steering disk 10 receive the clutch pins 62, thus keeping the clutch actuation ring 63 forced upward by the torsion spring 66 and allowing the clutch balls 59 to come out of the side recesses 53a of the ring gear 16 so as to operationally disconnect the driven steering drum 6 from the ring gear 16 as is shown in FIG. 8. Accordingly, manual steering, without power assist by the electric motor 15, is continued.

Figure 9:
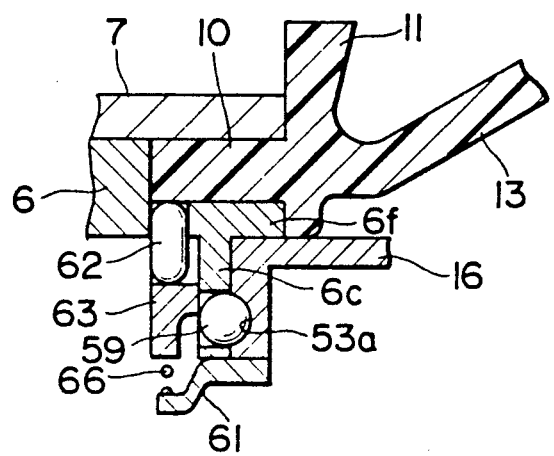

As the steering torque on the steering wheel 3 is increased, the torsion spring 26 or 27 is increasingly tensioned. When the steering torque reaches a predetermined level, the torsion spring 26 or 27 starts expanding, thus allowing the drive steering disk 10 to rotate relative to the driven steering drum 6. This causes the drive steering disk 10 to disengage the clutch pins 62 from the recesses 67 and force them downward as is shown in FIG. 7. This forces the clutch actuation ring 63 downward against the torsion spring 66, thus pushing out the clutch balls 59 and causing them to partially enter the side recesses 53a of the ring gear 16, whereby the driven steering drum 6 and the ring gear 16 are coupled together as shown in FIG. 9, so that the power-assisted steering system is operated by the assistance of the electric motor 15 in a similar manner to that in the previous embodiment.

FIGS. 10 to 14 show a power assisted steering system in accordance with another preferred embodiment of the present invention which is made in an attempt at overcoming the restrictions to designing the strut angle of the cam surface and the angular displacement of the cam follower roller.

Figure 10:
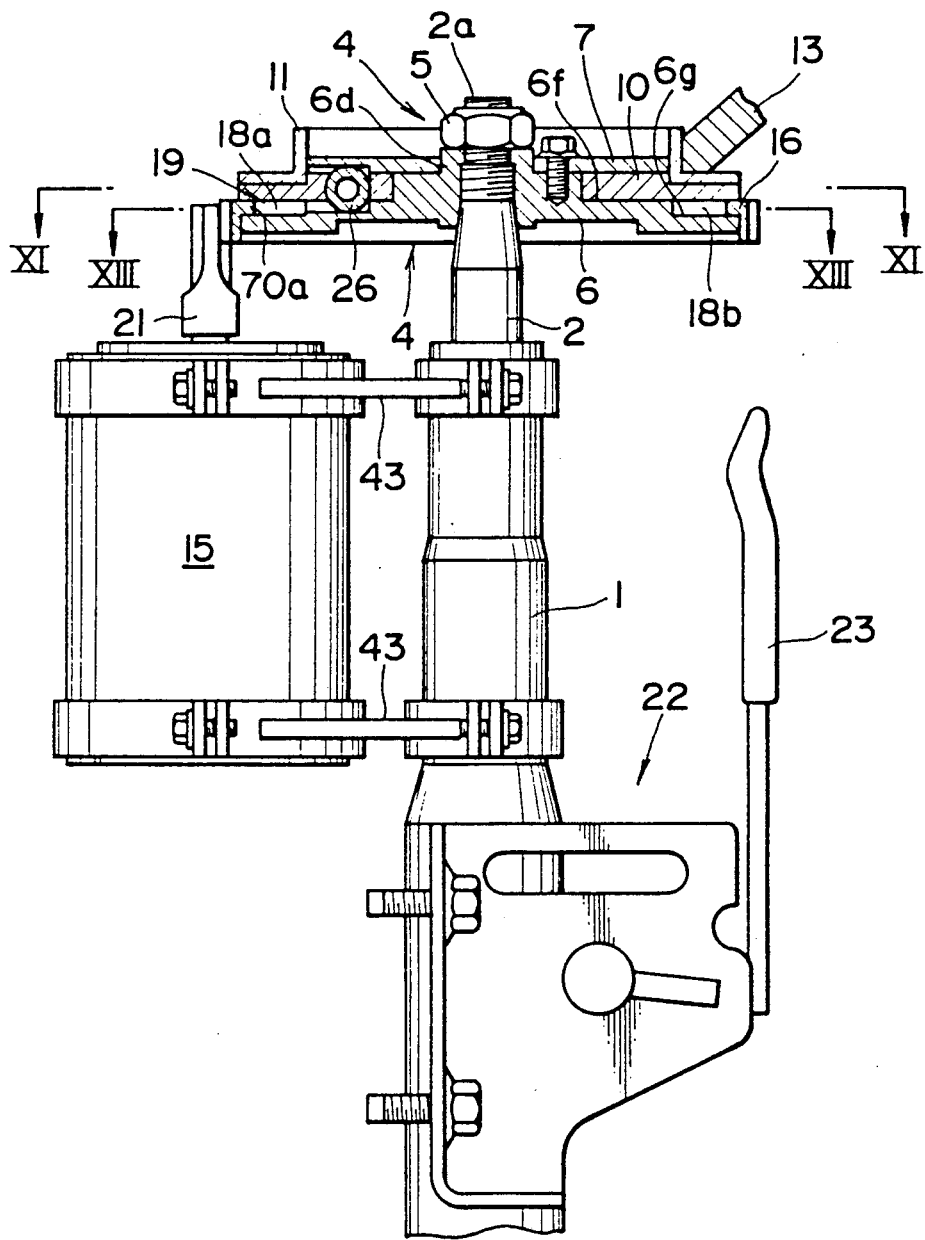
FIG. 10 is a side view, partly in section, showing an essential part of a power-assisted steering system in accordance with still another preferred embodiment of the present invention.

Referring to FIG. 10, a motor driven member in the form of an externally threaded ring gear 16 has an inwardly extending flange 70a held or supported for rotation between a drive steering disk 10 and a lower stepped portion 6g of the driven steering drum 6. The ring gear 16 is in mesh with a threaded output shaft 21 of an electric motor 15.

Figure 11:
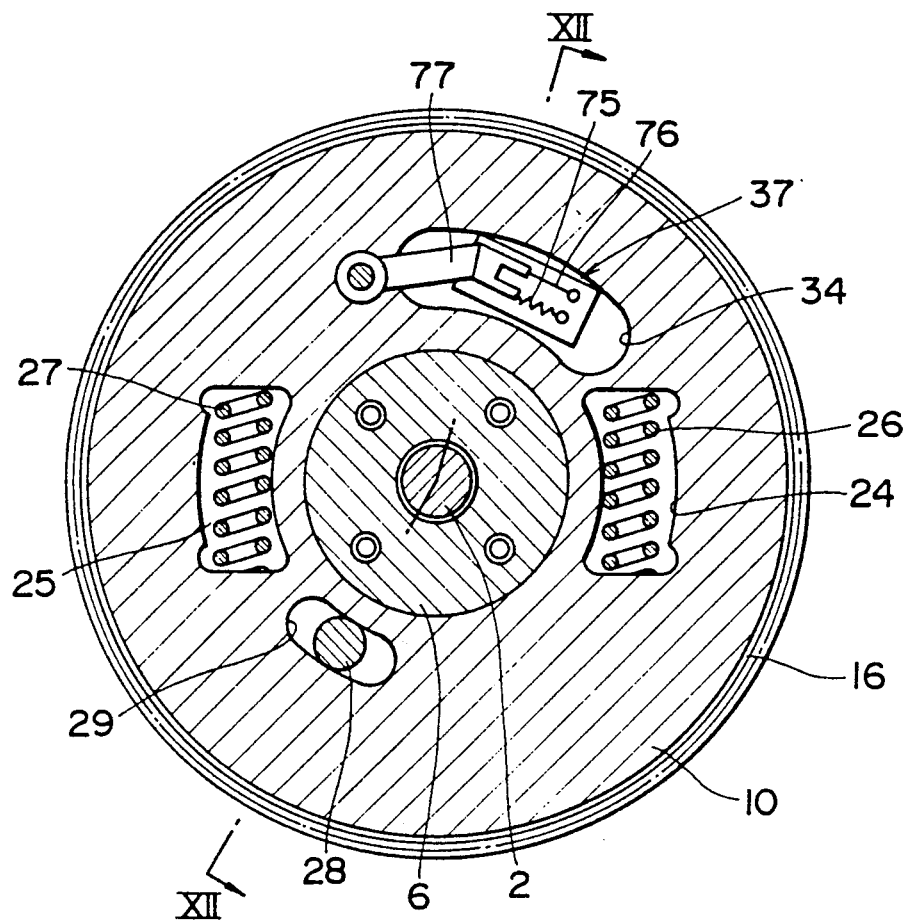
FIG. 11 is a cross-sectional view of FIG. 10 taken along line XI—XI.
Figure 12:
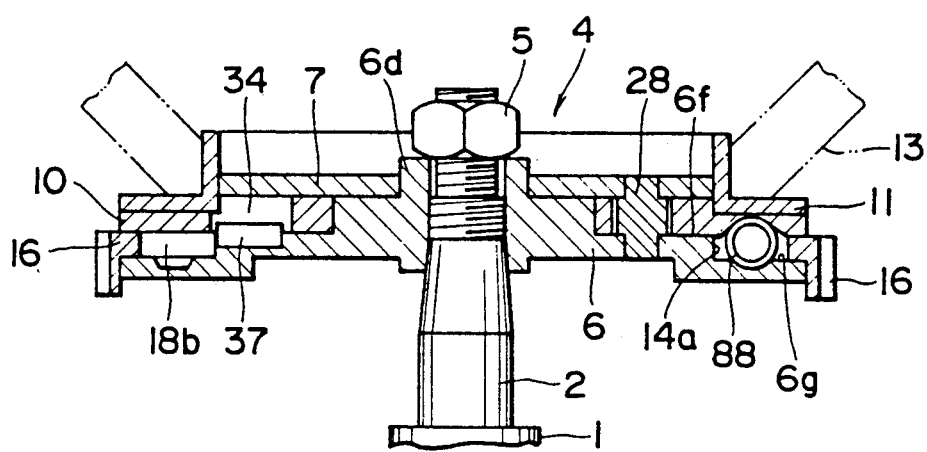
FIG. 12 is a cross-sectional view of FIG. 11 taken along line XII—XII.

The drive steering disk 10 is, as shown in FIG. 11, formed with generally rectangular openings 24 and 25 which, respectively, receive therein torsion springs 26 and 27 stretched between the driven steering drum 6 and the drive steering disk 10. The torsion springs 26 and 27 operationally couple the drive steering disk 10 to the driven steering drum 6 so as to transmit a driver's steering or turning torque to the driven steering drum 6 from the drive steering disk 10 in the same manner as in any one of the previous embodiments.

A torque detector 37 for detecting a steering torque imparted to the steering wheel 3, which is a potentiometer or a sliding contact resistor device, consists of a resistance wire 75 and lead wire 76 held by the middle step 6f of the driven steering drum 6, and a sliding contact lever 77 secured to the drive steering disk 10.

Figure 13:
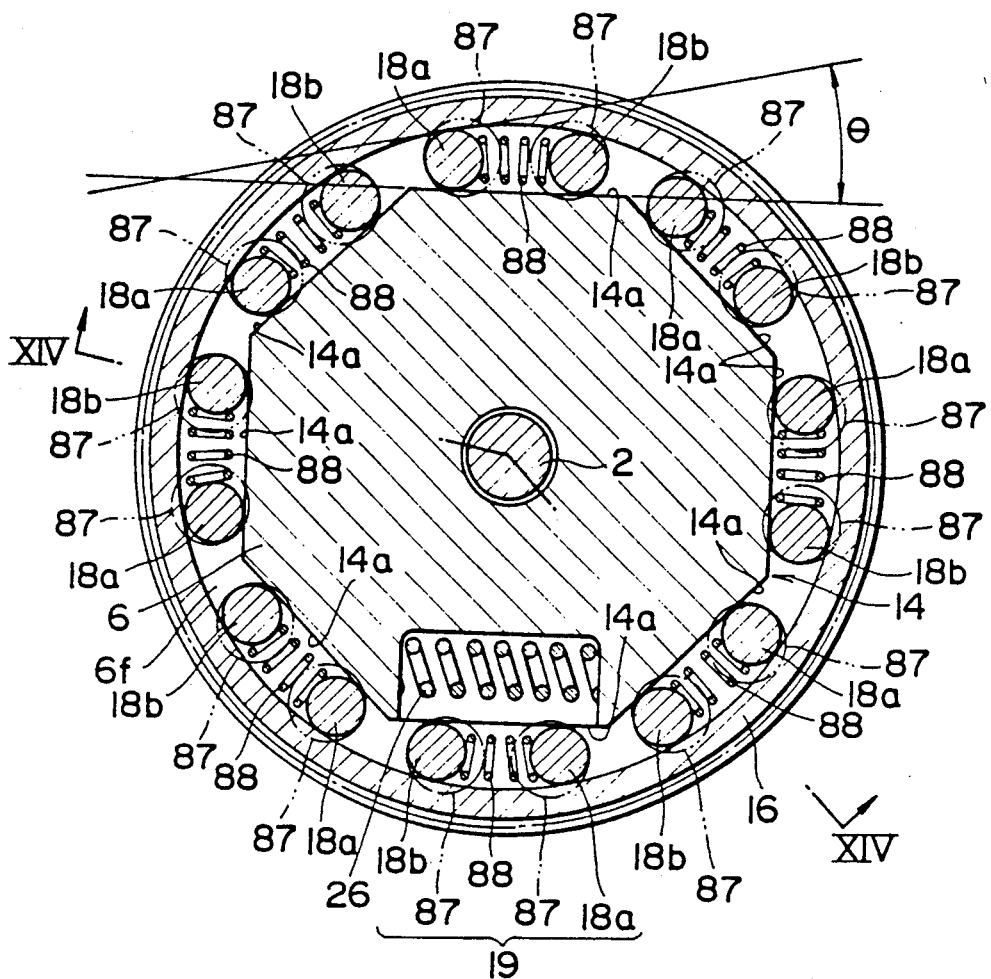
FIG. 13 is a cross-sectional view of FIG. 10 taken along line XIII—XIII.
Figure 14:
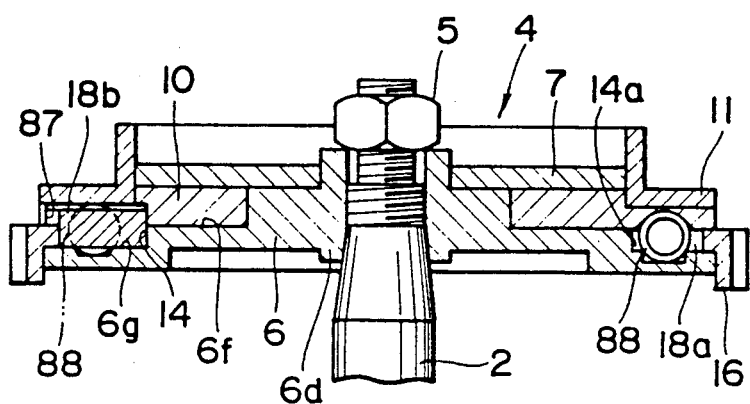
FIG. 14 is a cross-sectional view of FIG. 13 taken along line XIV—XIV.

Referring to FIGS. 13 and 14, provided in association with and between the ring gear 16 and the driven steering drum 6 is a power-assisting unit including a clutch mechanism 19. The clutch mechanism 19 consists of a peripheral cam surface 14 having eight cam sections 14a formed on the outer wall 6h of the driven steering drum 6 between an intermediate step portion 6f and a lower step portion 6g thereof and eight pairs of cam follower rollers 18a and 18b which are generally cylindrically configured. That is, the outer wall 6h of the driven steering drum 6 is octagonal in cross section. The sixteen cam follower rollers 18a and 18b are divided into eight pairs and each pair of cam follower rollers 18a and 18b are disposed between one and the same cam section 14a and the inner wall of the ring gear 16. Each pair of cam follower rollers 18a and 18b, respectively, acts as a coupling or clutch means upon left turn steering and right turn steering. The drive steering disk 10 is formed in its under surface with sixteen circular recesses 87 receiving the tops of the cylindrical cam follower rollers 18a and 18b. Each circular recess 87 has an inner diameter greater than an outer diameter of the cylindrical cam follower roller 18a or 18b so as to allow the cylindrical cam follower roller 18a or 18b to move therein.

The cam follower rollers 18a and 18b in each pair are forced in opposite directions by means of a torsion spring 88 disposed therebetween so as to be spaced apart from each other and contact with inner walls of the respective circular recesses 87 as long as no relative motion is caused between the driven steering drum 6 and the drive steering disk 10. In such a state or condition, the cam follower rollers 18a and 18b are held so as to keep slightly away from at least either one of the inner wall of the ring gear 16 and the cam section 14a of the driven steering drum 6, whereby releasing the clutch mechanism 19.

When the steering wheel 3 is turned to the right and the steering torque imparted to the steering wheel 3 is increased, a relative rotational motion in the right turn direction, namely in the clockwise direction, is caused between the drive steering disk 10 and the driven steering drum 6. The relative rotational motion in the right turn direction is followed by a clockwise displacement of the cam follower rollers 18a in contact with the inner walls of the circular recesses 87 of the drive steering disk 10. At this time, the cam follower rollers 18b are pushed and displaced in the same direction by the cam follower rollers 18a through the torsion springs 88. Therefore, the cam follower rollers 18a and 18b and the torsion springs 88 are displaced as one whole relative to the driven steering drum 6 as well as the drive steering disk 10. As a result, the cam follower rollers 18b are squeezed or bit and tightly grasped between the cam sections 14a and the inner wall of the ring gear 16, operationally coupling the driven steering drum 6 and the ring gear 16 together.

Upon this, whereas the cam follower roller 18b is firmly grasped between the cam section 14a and the inner wall of the ring gear 16 and prevented from displacing further more, nevertheless, the circular recess 87 permits the cam follower roller 18a to displace against the torsion spring 88 in the right turn direction, so that a further relative rotational motion is caused between the drive steering disk 10 and the driven steering drum 6. If a relative rotational motion of the drive steering disk 10 to the driven steering drum 6 is actually caused, the torque detector 37 outputs an electric signal to the electric control unit (ECU) indicating the changing angular position of the drive steering disk 10 relative to the driven steering drum 6. The electric control unit (ECU), when receiving the position signal, causes the electric motor 15 to rotate in a direction in which the drive steering disk 10 is forced, driving the ring gear 16, so as to assist the driver in manipulating the front wheels.

In a similar manner, when the steering wheel 3 is turned to the left and the steering torque imparted to the steering wheel 3 is increased, a relative rotational motion in the left turn direction, is caused between the drive steering disk 10 and the driven steering drum 6. As the result of the relative rotational motion in the right turn direction, the cam follower rollers 18a are bit and grasped between the cam sections 14a and the inner wall of the ring gear 16, operationally coupling the driven steering drum 6 and the ring gear 16 together. When a further relative rotational motion of the drive steering disk 10 to the driven steering drum 6 is caused, the electric motor 15 rotates in a direction in which the drive steering disk 10 is forced, driving the ring gear 16, so as to assist the driver in manipulating the front wheel.

Because of the cam follower rollers 18a and 18b which act independently to couple the driven steering drum 6 and the drive steering disk 10 together according to the directions in which the steering wheel 3 is turned, it is made possible to dimensionally design the cam follower rollers 18a and 18b independently from each other, whereby optimum strut angles ($\theta$) can be established independently for right turn and left turn, so that the clutch mechanism 19 is designed to act reliably in any direction.

The torsion springs 26 and 27 used in the power-assisted steering system shown in FIGS. 10 to 13 can be replaced with various types of spring members with the same result.

Figure 15:
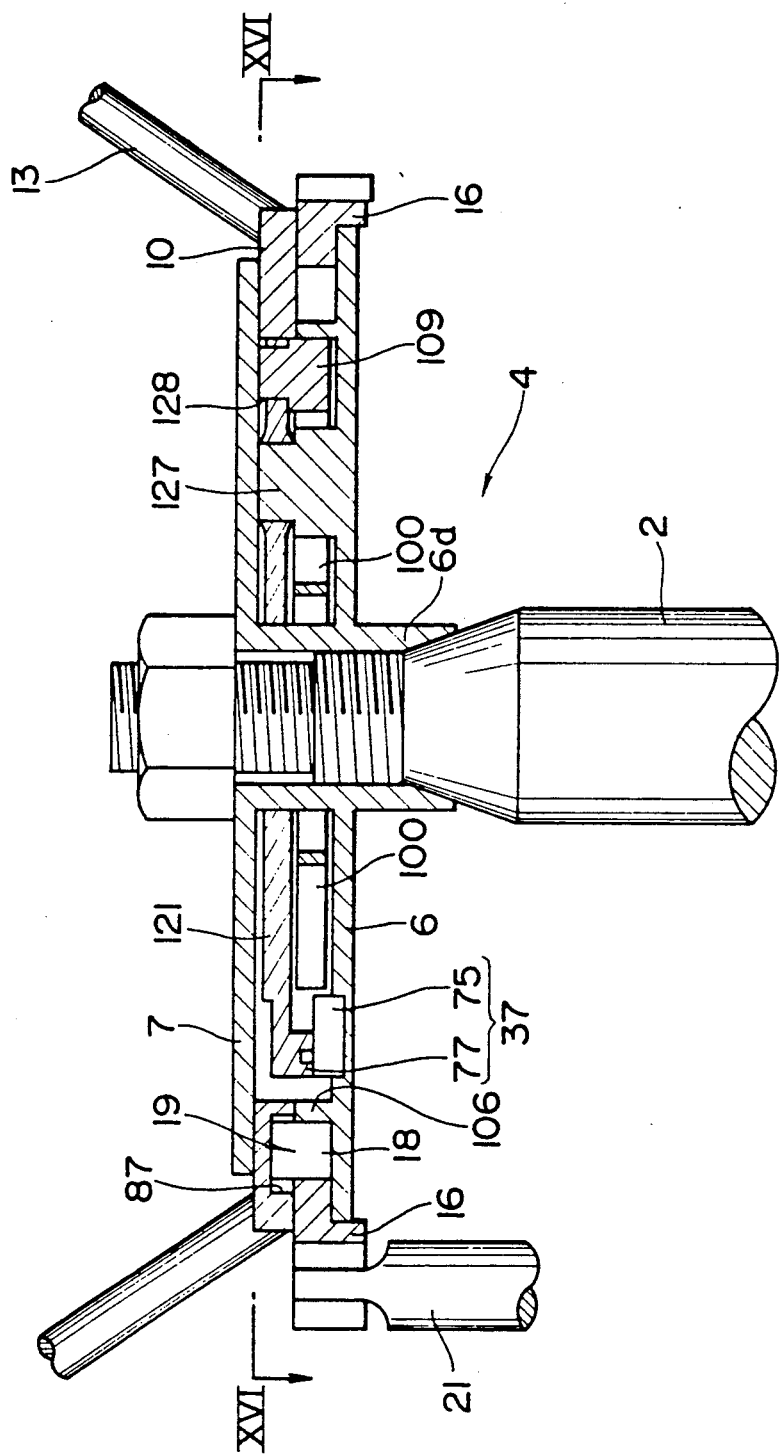
FIG. 15 is a side view, partly in cross-section, showing an essential part of a power-assisted steering system in accordance with yet another preferred embodiment of the present invention.
Figure 16:
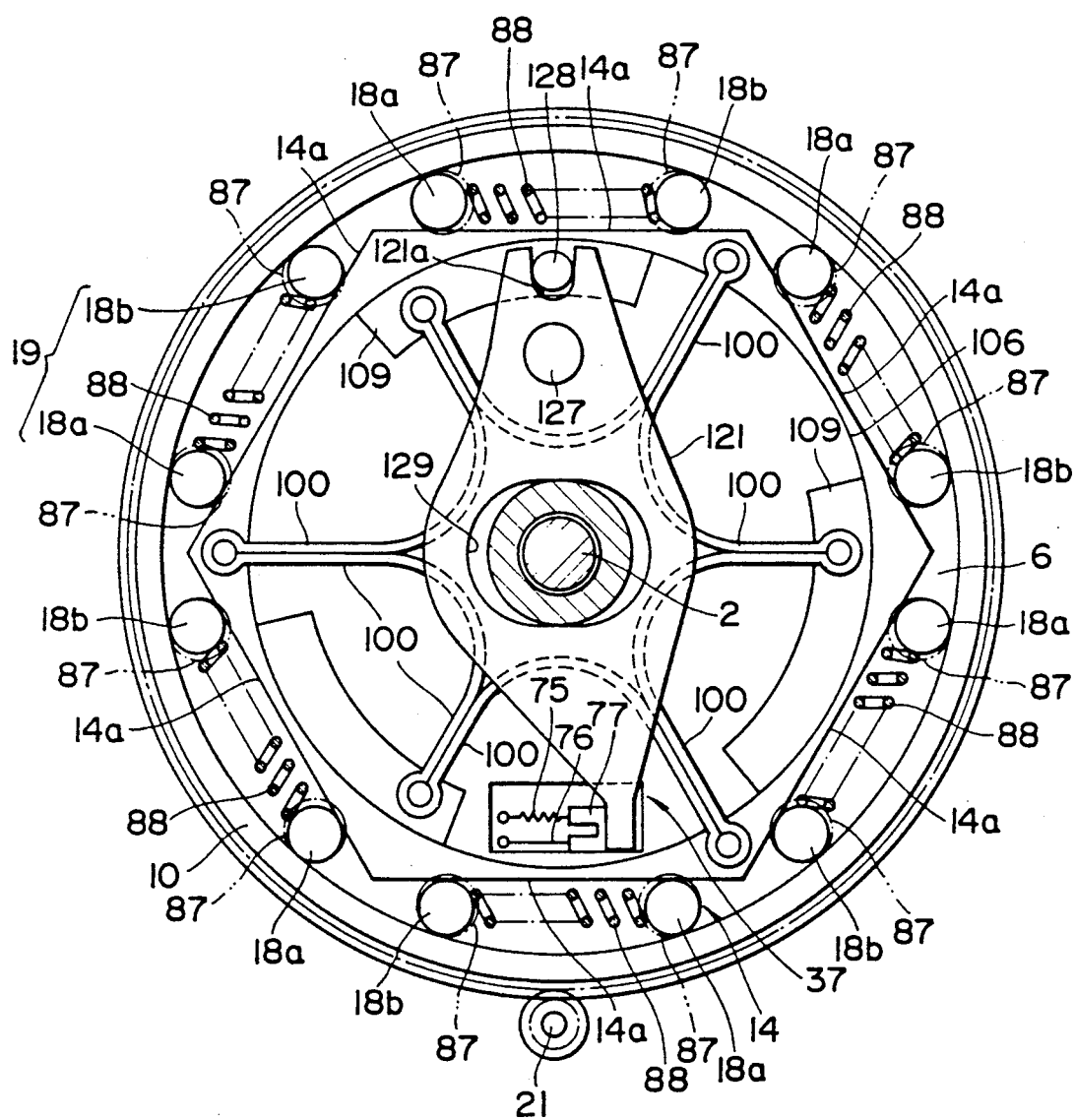
FIG. 16 is a cross-sectional view of FIG. 15 taken along line XVI—XVI.

Referring to FIGS. 15 and 16, a power-assisted steering system in accordance with still another preferred embodiment of the present invention is shown, utilizing six leaf springs 100 disposed between the driven steering drum 6 and the drive steering disk 10 at regular angular spacings. The driven steering drum 6 is integrally provided with an annular wall 106 which is formed with six cam sections 14a on its outer peripheral surface at regular angular spacings. The drive steering disk 10 is formed with three integral arcuate guide walls 109 at regular angular spacings which are slidably supported by and within the annular wall 106 for rotational movement. Each leaf spring 100, which is bent and formed in a U-shape, has one end secured to the annular wall 106 of the driven steering drum 6 and the other end secured to the guide walls 109 of the drive steering disk 10, so that a relative rotational movement is caused between the drive steering disk 10 and the driven steering drum 6 when a steering torque transmitted from the steering wheel 3 becomes too great.

The driven steering drum 6 is integrally formed with a mounting pin 127 which mounts an arm 121 of a torque detector 37 for rotation. One end of the arm 121 is formed with a notch 121a which receives a pin 128 secured to one of the guide walls 109 of the drive steering disk 10. The arm 121 is further formed with an arcuate hole 129 which slidably receives the hub of the driven steering drum 6, so that the arm 121 can swing about the mounting pin 127 when a relative rotation is caused between the driven steering drum 6 and the drive steering disk 10.

Figure 17:
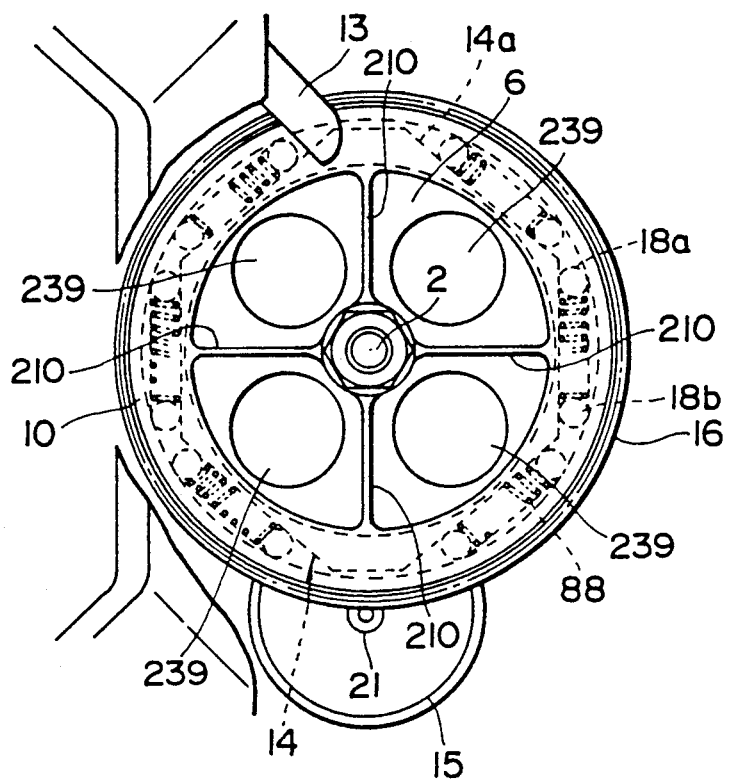
FIG. 17 and 18 are cross-sectional views showing an essential part of a power-assisted steering system in accordance with a further preferred embodiment of the present invention.
Figure 18:
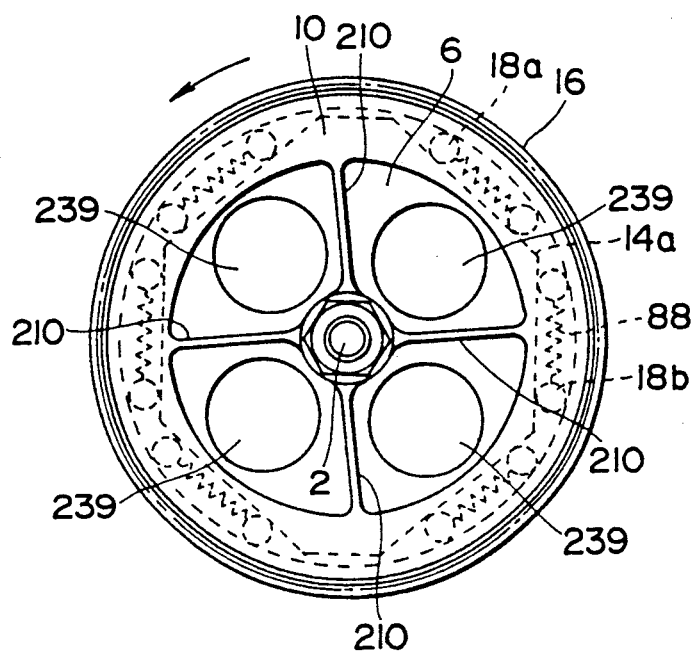

Referring to FIGS. 17 and 18, a power-assisted steering system in accordance with yet another preferred embodiment of the present invention is shown, utilizing four radially extending elastic members 210 formed integrally with the drive steering disk 10 at regular angular spacings. Each elastic member 210 is secured to the driven steering drum 6 at the inner end thereof. When a relative rotational motion is caused between the drive steering disk 10 and the driven steering drum 6 with an increased steering torque transmitted from the steering wheel 3, the elastic members 210 are deformed in a direction wherein the drive steering disk 10 rotates as is shown in FIG. 18. Designated by a reference numeral 239 are holes formed in the driven steering drum 6 for lightening the whole weight of the power-assisted steering system.

Figure 19:
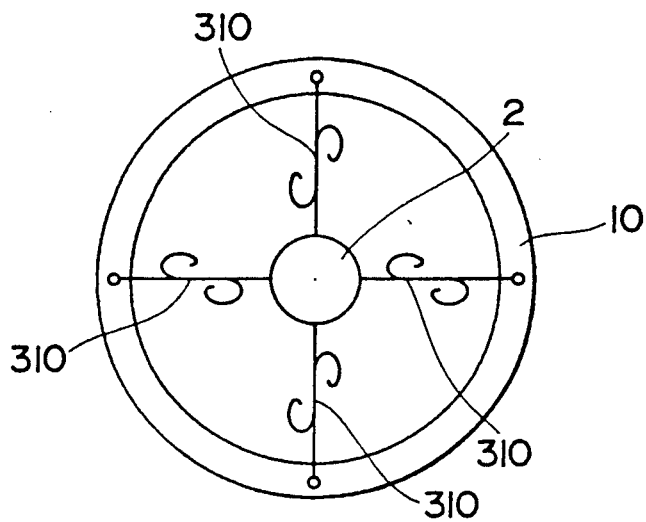
FIG. 19 is an explanatory view showing an essential part of a power-assisted steering system in accordance with a still further preferred embodiment of the present invention.
Figure 20:
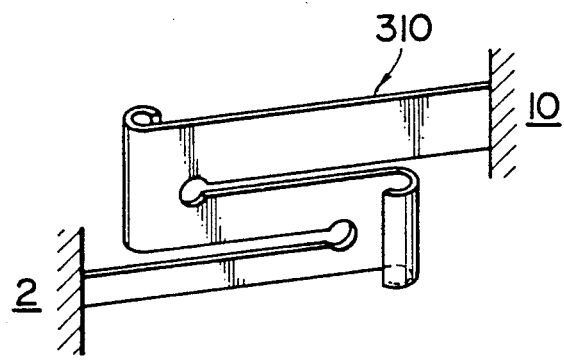
FIG. 20 is a perspective view showing a spring member used in the power-assisted steering system shown in FIG. 19.

Otherwise, as shown in FIGS. 19 and 20, the leaf springs or the elastic spring members may be replaced with generally S-shaped leaf springs 310 which have one ends secured directly to the steering shaft 2 and the other ends secured to the drive steering disk 10. Because the driven steering drum 6 is operationally integral with the steering shaft 2, a relative rotational motion between the driven steering drum 6 and the drive steering disk 10 is allowed.

Figure 21:
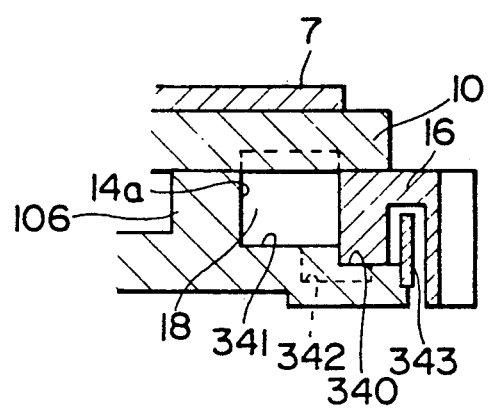
FIG. 21 is a cross-sectional view showing a lubricant holding structure incorporated in the power-assisted steering system shown in FIG. 15.

Referring to FIG. 21, a lubricant holding structure utilized in the power-assisted steering system described above and shown in FIGS. 15 and 16 is shown. The driven steering drum 6 is formed with an annular shoulder or seating groove 340 formed at an outer circumferential portion of the driven steering drum 6. The ring gear 16 is fitted in the annular shoulder 340 and forms a liquid-tight closed chamber 341 in cooperation with the annular wall 106 and the drive steering disk 10 so as to enclose the cam follower rollers and the torsion springs, whereby preventing a lubricant for the cam follower rollers from leaking from the power-assisting unit. The driven steering drum 6 is formed in the bottom wall with lubricant retaining recesses 342 partly extending in the annular shoulder 340. For more effective prevention of leakage of the lubricant, the driven steering drum 6 is provided with a annular ring 343 fixed to the outer periphery thereof and extending in an annular groove formed in the ring gear 16.

It is to be understood that whereas the invention has been described in detail with reference to preferred embodiments thereof, nevertheless, various other embodiments and variants are possible which are within the spirit and scope of the invention, and such are intended to be covered by the following claims.

What is claimed is:

1. A power-assisted steering system for an automotive vehicle having a steering shaft rotatably supported by a steering column and a steering wheel through which a steering torque is transmitted to said steering shaft, said steering system comprising:
    an electric motor mounted on said steering column having an output shaft offset from said steering shaft;
    a connecting structure, said connecting structure comprising a driven steering member fixed to said steering shaft, a drive member fixed to said steering wheel, a motor driven member engaging said output shaft disposed radially outwardly of said driven steering member, a clutch mechanism disposed between said motor driven member and said driven steering member, and at least one spring disposed between said driven steering member and said drive member, said at least one spring providing a torsional resistance to movement of said drive member relative to said driven steering member, said connecting structure selectively connecting said steering shaft to a steering torque transmitted from said steering wheel when said steering torque is smaller than a predetermined torque equal to said torsional resistance and a motor output transmitted from said output shaft when said steering torque is greater than said predetermined torque; and torque detecting means disposed in cooperation with said connecting structure for detecting said predetermined torque so as to actuate said electric motor, thereby rotating said output shaft and said motor driven member, engaging said clutch, and assisting in rotating said steering shaft.

2. A power-assisted steering system as defined in claim 1, wherein said clutch mechanism permits a relative rotation between said steering wheel and said steering shaft as said steering torque becomes greater beyond said predetermined torque, said relative rotation causing said motor driven member to releasably connect said steering shaft to said motor output transmitted from said output shaft of said electric motor.

3. A power-assisted steering system as defined in claim 2, wherein said drive member is a drive disk structurally integral with said steering wheel and mounted on said steering shaft, said driven steering member is a driven disk secured to said steering shaft and said at least one spring is disposed between and connects said drive disk and said driven disk so as to allow said relative rotation therebetween.

4. A power-assisted steering system as defined in claim 3, wherein said motor driven member is a ring gear in mesh with said output shaft of said electric motor disposed coaxially with said driven disk, and wherein said clutch mechanism includes coupling means for mechanically coupling together said driven disk and said ring gear, thereby connecting said steering shaft to said motor output transmitted from said electric motor through said output shaft.

5. A power-assisted steering system as defined in claim 4, wherein said coupling means includes a cam surface formed on said driven disk and a cam follower member interposed between said cam surface and said ring gear, said cam follower member being displaced along said cam surface by said relative rotation so as to be tightly grasped between said cam surface and said ring gear to mechanically couple together said driven disk and said ring gear.

6. A power-assisted steering system as defined in claim 5, and further comprising at least one elastic member and a retainer for receiving and retaining said cam follower member, said elastic member attached to said drive disk and said retainer.

7. A power-assisted steering system as defined in claim 6, wherein said cam follower member is a cylindrical roller.

8. A power-assisted steering system as defined in claim 7, wherein a plurality of said coupling means are disposed about said connecting structure at regular angular spacings.

9. A power-assisted steering system as defined in claim 4, wherein said coupling means comprises a cam surface formed on said driven disk and two cam follower members interposed between said cam surface and said ring gear, said two cam follower members being displaced along said cam surface in one direction so that one of said two cam follower members is tightly grasped between said cam surface and said ring gear upon one of right and left turns of said steering wheel and in the opposite direction so that the other of said two cam follower members is grasped between said cam surface and said ring gear upon the other of said right and left turns of said steering wheel by said relative rotation, thereby mechanically coupling together said driven disk and said ring gear.

10. A power-assisted steering system as defined in claim 9, wherein said two cam follower members are forced to move away from each other by an elastic member disposed between the two cam follower members.

11. A power-assisted steering system as defined in claim 10, wherein said two cam follower members are restricted in movement away from each other by restricting means provided in said drive disk.

12. A power-assisted steering system as defined in claim 11, wherein each of said cam follower members is a cylindrical roller and said restricting means is a recess which receives a top of one said cylindrical roller to allow said cylindrical roller to move therein.

13. A power-assisted steering system as defined in claim 3, wherein said torque detecting means is a potentiometer disposed between said drive disk and said driven disk for providing an appropriate electric signal according to an amount of said relative rotation between said drive disk and said driven disk to actuate said electric motor.

14. A power-assisted steering system as defined in claim 5, wherein said coupling means, said ring gear, said at least one spring and said torque detecting means are arranged substantially in one plane.

15. A power-assisted steering system as defined in claim 1, wherein said clutch mechanism includes at least one cam surface formed on said driven steering member and two cam follower members provided for each said cam surface and cooperating with said drive member during left and right turns of said steering wheel, said cam follower members being interposed between said motor driven member and said cam surface so as to interlock said motor driven member and said driven steering member during said relative rotation, thereby assisting in rotating said steering shaft.

16. A power-assisted steering system as defined in claim 15, wherein each of said two cam follower members are forced to move away from each other by an elastic member.

17. A power-assisted steering system as defined in claim 16, wherein each of said two cam follower members are restricted in said movement away from each other by restricting means provided in association with said drive member.

18. A power-assisted steering system as defined in claim 17, wherein said drive member and said driven steering member are plates mounted on said steering shaft for rotation relative to each other, and said restricting means are recesses formed in said drive member for partly receiving said cam follower members.

* * * * *